United States Patent [19]

Fluet

[11] 3,864,556

[45] Feb. 4, 1975

[54] APPARATUS FOR DIGITAL FREQUENCY SCALING

[75] Inventor: Francis A. Fluet, Clarence, N.Y.

[73] Assignee: Westinghouse Electric Corporation, Pittsburgh, Pa.

[22] Filed: Oct. 31, 1973

[21] Appl. No.: 411,543

[52] U.S. Cl. .............. 235/150.3, 325/38 A, 328/38, 328/133

[51] Int. Cl. ............................................ G01r 23/02

[58] Field of Search ............. 328/38, 133, 134, 140, 328/141, 37; 235/150.3; 325/38 A

[56] References Cited

UNITED STATES PATENTS

| | | | |
|---|---|---|---|
| 2,748,283 | 5/1956 | Merrill et al. | 328/38 |
| 3,199,037 | 8/1965 | Graves | 328/133 |
| 3,219,935 | 11/1965 | Katakami | 328/38 |
| 3,646,330 | 2/1972 | Rudnick et al. | 235/150.3 |

*Primary Examiner*—Malcolm A. Morrison
*Assistant Examiner*—Errol A. Krass
*Attorney, Agent, or Firm*—J. J. Wood

[57] ABSTRACT

Apparatus for digital frequency scaling having a first adder with dual inputs of opposite sign, one of the dual inputs receiving a signal which is a multiple *a*, times an input signal *fin*, the other of the dual inputs receiving a weighted scale signal *bfo* where *b* is a scale number 1,2,3, . . . .*m*, and *fo* is the output of the apparatus. An accumulating numerator register having digital output contents N is connected to the output of the first adder. A second adder having dual inputs, has an output connected to an accumulating remainder register having digital output contents R. One of the dual inputs of the second adder receives the contents N as a function of clock signals of frequency *fc*, the other of the dual inputs receiving a signal *bD*,where D is a preselected stored number. Comparators are connected to the accumulating remainder register for comparing N with *b*D, and R with O, for selecting the smallest scale number *b* such that N<*b*D, and for delivery output signal *fo* when R <O.

7 Claims, 7 Drawing Figures

PATENTED FEB 4 1975 3,864,556

$$\frac{fo(S)}{fin(S)} \quad \frac{a}{b} \; \frac{1}{1+(S)\left(\frac{D}{fc}\right)}$$

| | ΣN | N | N≤D | b=1 | N>D | b=10 | ΣRem | R | fo |
|---|---|---|---|---|---|---|---|---|---|
| 0 | 0 | 0 | 1 | 1 | 0 | 0 | 0 | 0 | 0 |
| 1 | +5 | +5 | 1 | 1 | 0 | 0 | -5 | -5 | 0 |
| 2 | +5+5-1 | +9 | 1 | 1 | 0 | 0 | -5-9+10 | -4 | 1 |
| 3 | +9+5-1 | 13 | 1 | 1 | 0 | 0 | -4-13+10 | -7 | 1 |
| 4 | +13+5-10 | 8 | 0 | 0 | 1 | 10 | -7-8+100 | 85 | 10 |
| 5 | +8+5 | 13 | 1 | 1 | 0 | 0 | 85-13 | 72 | 0 |
| 6 | 13+5 | 18 | 0 | 0 | 1 | 10 | 72-18 | 54 | 0 |
| 7 | 18+5 | 23 | 0 | 0 | 1 | 10 | 54-23 | +31 | 0 |
| 8 | 23+5 | 28 | 0 | 0 | 1 | 10 | 31-28 | +3 | 0 |
| 9 | 28+5 | 33 | 0 | 0 | 1 | 10 | +3-33 | -30 | 0 |
| 10 | 33+5-10 | 28 | 0 | 0 | 1 | 10 | -30-28+100 | +42 | 10 |
| 11 | 28+5 | 33 | 0 | 0 | 1 | 10 | 42-33 | 9 | 0 |
| 12 | 33+5 | 38 | 0 | 0 | 1 | 10 | 9-38 | -29 | 0 |
| 13 | 38+5-10 | 33 | 0 | 0 | 1 | 10 | -29-33+100 | +38 | 10 |
| 14 | 33+5 | 38 | 0 | 0 | 1 | 10 | 38-38 | 0 | 0 |
| 15 | 38+5 | 43 | 0 | 0 | 1 | 10 | 0-43 | -43 | 0 |
| 16 | 43+5-10 | 38 | 0 | 0 | 1 | 10 | -43-38+100 | +19 | 10 |
| 17 | 38+5 | 43 | 0 | 0 | 1 | 10 | 19-43 | -24 | 0 |
| 18 | 43+5-10 | 38 | 0 | 0 | 1 | 10 | -24-38+100 | +38 | 10 |
| 19 | 38+5 | 43 | 0 | 0 | 1 | 10 | +38-43 | -5 | 0 |
| 20 | 43+5-10 | 38 | 0 | 0 | 1 | 10 | -5-38+100 | 57 | 10 |
| 21 | 38+5 | 43 | 0 | 0 | 1 | 10 | 57-43 | 14 | 0 |
| 22 | 43+5 | 48 | 0 | 0 | 1 | 10 | 14-48 | -34 | 0 |
| 23 | 48+5-10 | 43 | 0 | 0 | 1 | 10 | -34-43+100 | +23 | 10 |
| 24 | 43-5 | 48 | 0 | 0 | 1 | 10 | 23-48 | -25 | 0 |
| 25 | 48+5-10 | 43 | 0 | 0 | 1 | 10 | -25-43+100 | +32 | 10 |

FIG. 6A

| | ≦N | N | N≤D | b=1 | N>D | b=10 | ≦Rem | R | fo |
|---|---|---|---|---|---|---|---|---|---|
| 26 | 43+5 | 48 | 0 | 0 | 1 | 10 | +32−48 | −16 | 0 |
| 27 | 48+5−10 | 43 | 0 | 0 | 1 | 10 | −16−43+100 | +41 | 10 |
| 28 | 43+5 | 48 | 0 | 0 | 1 | 10 | +41−48 | −7 | 0 |
| 29 | 48+5−10 | 43 | 0 | 0 | 1 | 10 | −7−43+100 | +50 | 10 |
| 30 | 43+5 | 48 | 0 | 0 | 1 | 10 | +50−48 | +2 | 0 |
| 31 | 48+5 | 53 | 0 | 0 | 1 | 10 | +2−53 | −51 | 0 |
| 32 | 53+5−10 | 48 | 0 | 0 | 1 | 10 | −51−48+100 | +1 | 10 |
| 33 | 48+5 | 53 | 0 | 0 | 1 | 10 | +1−53 | −52 | 0 |
| 34 | 53+5−10 | 48 | 0 | 0 | 1 | 10 | −52−48+100 | 0 | 10 |
| 35 | 48+5 | 53 | 0 | 0 | 1 | 10 | 0−53 | −53 | 0 |
| 36 | 53+5−10 | 48 | 0 | 0 | 1 | 10 | −53−48+100 | −1 | 10 |
| 37 | 48+5−10 | 43 | 0 | 0 | 1 | 10 | −1−43+100 | +56 | 10 |
| 38 | 43+5 | 48 | 0 | 0 | 1 | 10 | +56−48 | +8 | 0 |
| 39 | 48+5 | 53 | 0 | 0 | 1 | 10 | +8−53 | −45 | 0 |
| 40 | 53+5−10 | 48 | 0 | 0 | 1 | 10 | −45−48+100 | +7 | 10 |
| 41 | 48+5 | 53 | 0 | 0 | 1 | 10 | +7−53 | −46 | 0 |
| 42 | 53+5−10 | 48 | 0 | 0 | 1 | 10 | −46−48+100 | +6 | 10 |
| 43 | 48+5 | 53 | 0 | 0 | 1 | 10 | +6−53 | −47 | 0 |
| 44 | 53+5−10 | 48 | 0 | 0 | 1 | 10 | −47−48+100 | +5 | 10 |
| 45 | 48+5 | 53 | 0 | 0 | 1 | 10 | +5−53 | −48 | 0 |
| 46 | 53+5−10 | 48 | 0 | 0 | 1 | 10 | −48−48+100 | +4 | 10 |
| 47 | 48+5 | 53 | 0 | 0 | 1 | 10 | +4−53 | −49 | 0 |
| 48 | 53+5−10 | 48 | 0 | 0 | 1 | 10 | −49−48+100 | +3 | 10 |
| 49 | 48+5 | 53 | 0 | 0 | 1 | 10 | +3−53 | −50 | 0 |
| 50 | 53+5−10 | 48 | 0 | 0 | 1 | 10 | −50−48+100 | +2 | 10 |

FIG. 6B

APPARATUS FOR DIGITAL FREQUENCY SCALING

CROSS REFERENCE TO RELATED AAPPLICATION

See copending application for "Apparatus for Digital Frequency Multiplication" Ser. No. 410,134, filed on Oct. 26, 1973, now U.S. Pat. No. 3,828,169 in the name of Francis A. Fluet, and assigned to the same assignee as the instant invention.

BACKGROUND OF THE INVENTION

1. Field of the Invention

This invention relates to digital frequency (or pulse rate) scaling.

2. Description of the Prior Art

Techniques for frequency division and multiplication are well known in the art. For example, in subharmonic frequency generation, i.e., frequency division, digital counters, digital differential analyzers, and pulse rate multipliers are employed. Scaling up a given frequency, i.e., frequency multiplication, is somewhat more complicated involving as it does analog or digital phase locked loops.

In frequency multiplication the objective is to generate a digital pulse rate whose instantaneous frequency is a harmonic, i.e., some integer multiple of a given frequency. There are some techniques which generate an average frequency which is a multiple of a given frequency, but the instantaneous frequency is not an integer multiple of the given frequency.

The invention to be described herein generates an instantaneous frequency substantially equal to a multiple of the given input frequency, as well as, an average frequency which is exactly equal to a multiple of the input frequency. The invention can also generate subharmonics of the given frequency, and can automatically switch between modes or scale factors without accumulating any error. Prior art techniques do make provision for a change in scale factor, but very often this is accompanied by hysteresis at the point of crossover from one scale zone to another because of the error accumulated at each crossing.

SUMMARY OF THE INVENTION

Apparatus for frequency scaling is provided having means for deriving a signal *afin*, where *a* is a multiplication factor which may be an integer or a fraction, and *fin* is an input pulse train. Another means derives a weighted scale signal *bfo* where *b* is a scale number 1,2,3,4 ...*m* and *fo* is the output frequency of said apparatus. A first means integrates the signals *afin–bfo* to derive a signal N. Means are provided for deriving a signal *b*D, where D is a preselected stored number. A second means integrates the signals *b*D–N to derive a signal R. Finally, means compare N with *b*D and R with 0, and on the basis of these comparisons selecting the smallest scale number *b* such that N<*b*D and delivering the output signal *fo* when R<0.

BRIEF DESCRIPTION OF THE DRAWINGS

FIG. 6A and FIG. 6B comprise a table of a hypothetical operation showing the contents of the accumulating numerator and remainder registers, and the generation of the output pulses *fo*.

DESCRIPTION OF THE PREFERRED EMBODIMENT

Figure 4:
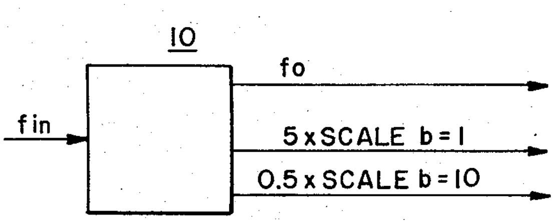
FIG. 4 is a block diagram of the digital frequency scaling apparatus of the invention.

For an overview of the operation, reference will first be had to FIG. 4 where the apparatus for digital frequency scaling is indicated generally at 10. A signal fin is transformed into an output signal *fo* in accordance with the frequency desired. The scaling apparatus 10 may be operated in one or more modes (scales). By way of illustration only two scales are shown: (*a*) 5 × scale *b* × 1 and (*b*) 0.5 × scale *b* × 10.

Figure 5:
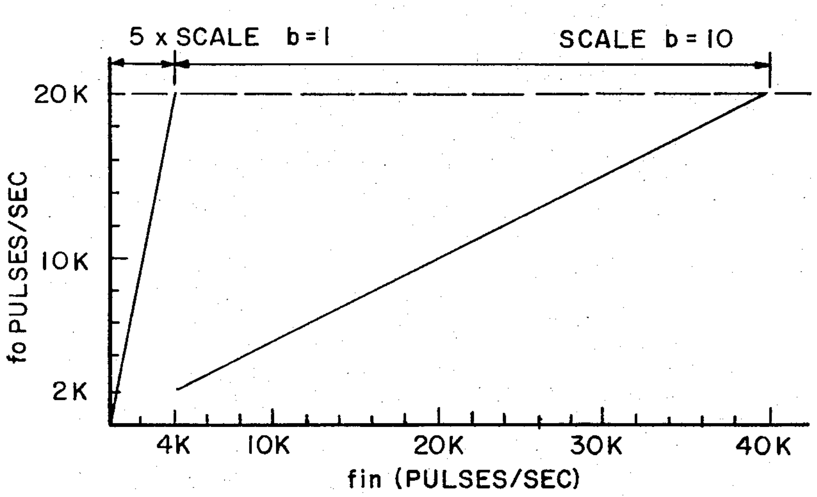
FIG. 5 is a graph showing the relationship, input frequency (*fin*) vs. output frequency (*fo*) for two different *b* scale factors.

As shown in FIG. 5 for any *fin* pulses/sec there is an *fo*. When the range for the scale is exceeded, i.e., *fin* > 4K pulses/sec, the apparatus switches automatically to a new scale or mode.

Figure 1:
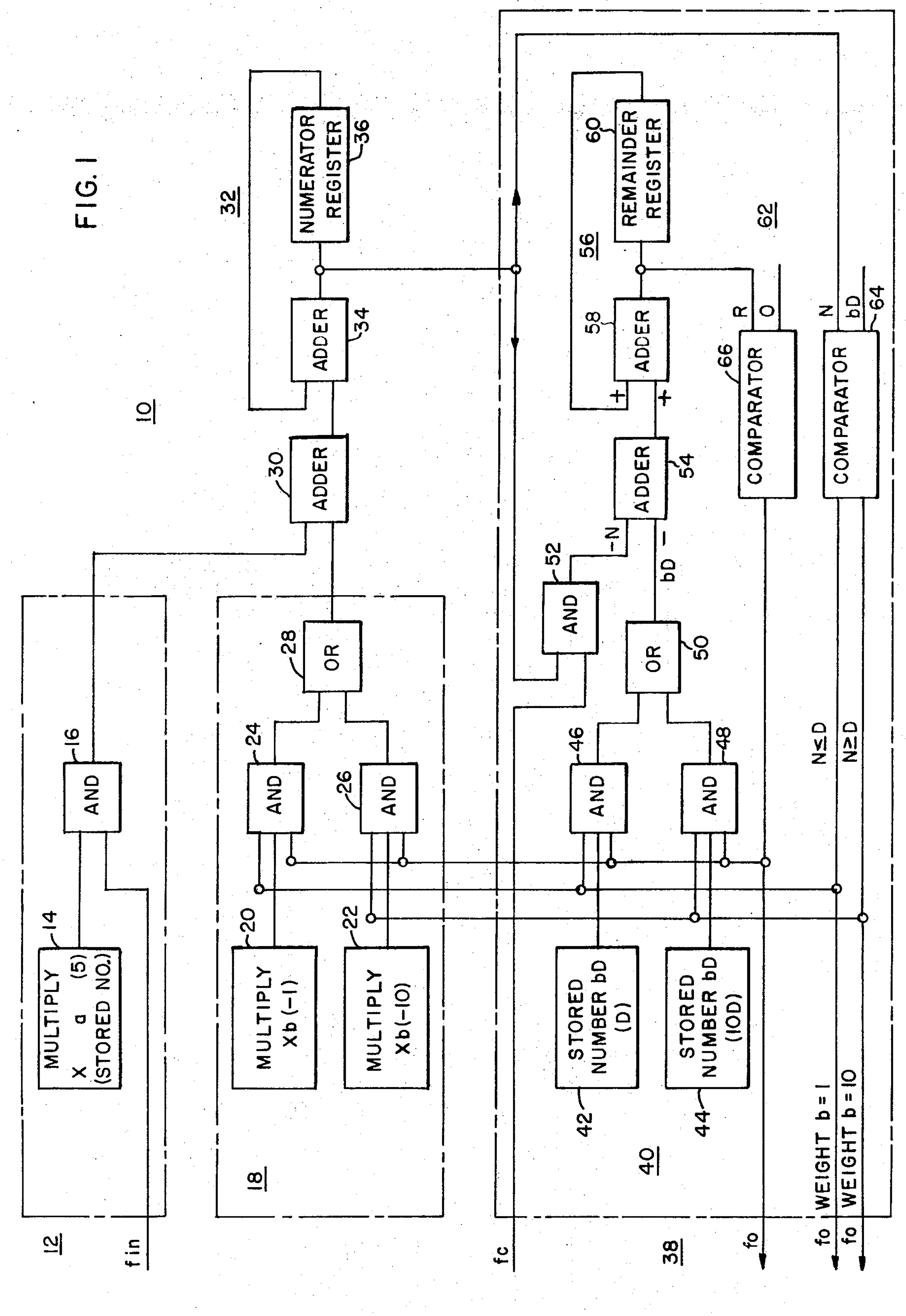
FIG. 1 is a block diagram depicting the apparatus for digital frequency scaling in accordance with the invention.

Referring now to FIG. 1, the apparatus for digital frequency scaling is indicated generally at 10. A first multiplication means identified generally at 12, comprises a multiplier 14 and an AND gate 16. The multiplier 14 contains a stored number a which in this particular embodiment is arbitrarily selected to be *a*5. It will be clear as the description proceeds that the output *fo* will then be the *ath* harmonic of the input frequency *fin*. In this case, *fo* is the fifth harmonic of the input frequency *fin*. The AND gate 16 has two inputs: (*a*) the output of the multiplier 14 and (*b*) the input frequency *fin*. A second multiplication means or *b* multiplication means, indicated generally at 18, comprises multipliers 20, 22, AND gates 24, 26 and OR gate 28. The scale number *b* may have the values 1,2,3...*m*. The multiplier 20 applies a stored number *b* = −1, while multiplier 22 supplies stored number *b* = −10. AND gate 24 has three inputs: (*a*) a scale enabling signal (5× scale) *b* = 1, (*b*) the stored number *b* = −1 and (*c*) the output signal *fo*. Similarly, AND gate 26 has three inputs: (*a*) a scale enabling signal (.5 × scale) *b* = 10, (*b*) the stored number *b* = −10, and (*c*) the output signal *fo*. The outputs of the AND gates 24, 26 are applied to OR gate 28. The outputs of AND gate 16 and OR gate 28 are applied to an ADDER 30. An accumulator numerator register indicated generally at 32 receives the output of the adder 30, and comprises ADDER 34 and numerator shift register 36. ADDER 34 has two inputs (*a*) the output of ADDER 30, and (*b*) the feedback from numerator shift register 36.

A digital frequency multiplier of the type described and claimed in the copending application for "Apparatus for Digital Frequency Multiplication" Ser. No. 410,134 filed on Oct. 26, 1973, now U.S. Pat. No. 3,828,169 in the name of Francis A. Fluett is identified generally at 38. The denominator modifying means is indicated generally at 40. Denominator storage means, are identified at 42 (having stored number D) and 44 (having stored number 10D). The outputs of the denominator storage means 42, 44 are applied to AND gates 46 and 48 respectively. The AND gate 46 has three inputs: (*a*) a scale enabling signal, for example, 5× scale $b = 1$, (*b*) the stored number for example D, and (*c*) the output signal *fo*. Similarly, the AND gate 48 has three inputs: (*a*) a scale enabling signal, for example 0.5 × scale $b = 10$, (*b*) the stored number, for example 10D, and (*c*) the output signal *fo*. The respective outputs of the AND gates 46, 48 are applied to OR gate 50.

The output N of the accumulator numerator register 32 is applied to AND gate 52. A second input to AND gate 52 is the clock frequency *fc*. The outputs of the OR gate 50 and the AND gate 52 (*b*D–N) are applied to ADDER 54. An accumulator remainder register is indicated generally at 56 and comprises ADDER 58 and remainder shift register 60. The output of the register 60 is fed back to the ADDER 58 which also receives as an input the output of ADDER 54.

Comparator means indicated generally at 62, compare N with *b*D and R with 0, selecting the smallest scale number *b* such that N<*b*D and delivering an output signal *fo* when R<0. Means 62 in this illustrative embodiment comprises comparator 64 and comparator 66 for comparing N with *b*D and R with 0 respectively.

OPERATION OF THE ILLUSTRATIVE EMBODIMENT

The FIG. 1 embodiment illustrates a simplified example of harmonic frequency generation ($a = 5$) in which the output *fo* is the fifth harmonic of the input frequency *fin* (*fo* = 5 *fin*). The digital frequency multiplier 38 described in the patent application cited supra is utilized with a constant input pulse rate *fc* = 20,000 pulses per second. In the frequency multiplier described in the cited patent application, after initialization, N is a constant. In the apparatus of FIG. 1 the numerator N is initially set equal to zero, and as the operation proceeds N changes as a function of *fin* and *fo*.

Thus, the numerator N searches for a magnitude commensurate with the denominator (D) and the frequency *fc* so as to generate *fo* equal to a times *fin*.

In the practical embodiment illustrated in FIG. 1, AND gate 16 has an output $a = 5$ every time *fin* is present. OR gate 28 will either have (*a*) no output or (*b*) an output of −1 or −10. OR gate 50 will either have (*a*) no output or (*b*) an output of D or 10D.

ADDER 30 will add:

a. 5 or
b. 5−1 or
c. 5−10

ADDER 54 will add:

a. − N or
b. −N+D or
c. −N+10D.

A better appreciation of the operation of the embodiment of FIG. 1 will be obtained from a detailed consideration of the hypothetical example illustrated in the table of FIG. 6. Let D = 10, and as previously stated let N be initialized to 0. At cycle 0, N<D and thus AND gates 24 and 46 have two of the required three inputs.

Cycle 1, ADDER 30 adds 5 to the accumulator 32 and N=5. AND gate 52 addes −5 to the accumulator remainder register 56.

Cycle 2, the −5 for the remainder R means there is an output *fo*, with the *fo* signal −1, AND gates 24 and 46 will be enabled. The ΣN and ΣR result in contents +9 and −4 respectively.

Cycle 3 the −4 for the remainder R develops another output *fo*.

Cycle 4 with N now at 13, N>D and the scales are switched viz. $b = 10$. 10D or 100 is now added to the remainder register.

It should now be clear how the table of FIG. 6 is constructed. An output *fo* is delivered when R < 0. As may be seen from a study of FIG. 6, N builds up from 0 and finally oscillates around the magnitudes 43–48–53.

LAPLACE TRANSFORM

Figure 2:
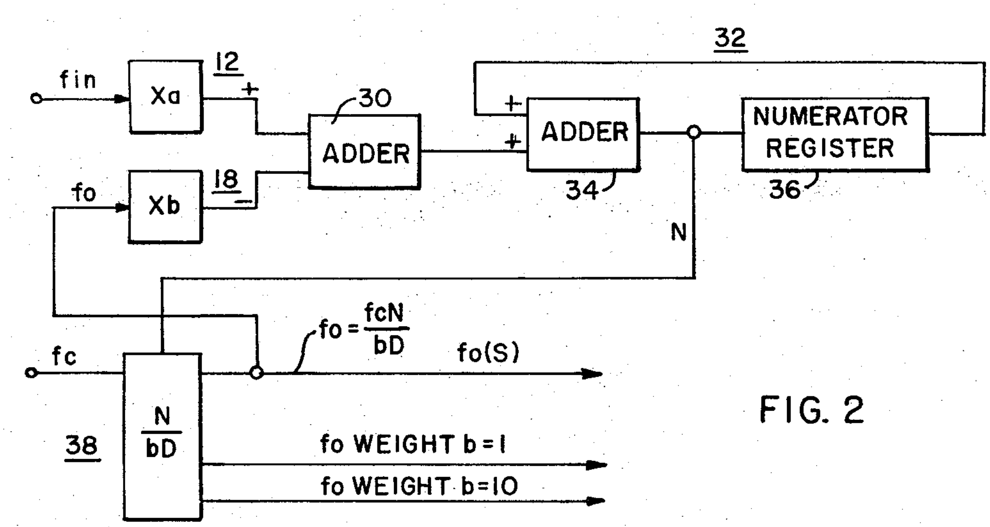
FIG. 2 is a simplified block diagram of the apparatus shown in FIG. 1.

A compact functional view of the apparatus of FIG. 1 is shown in FIG. 2.

Figure 3:
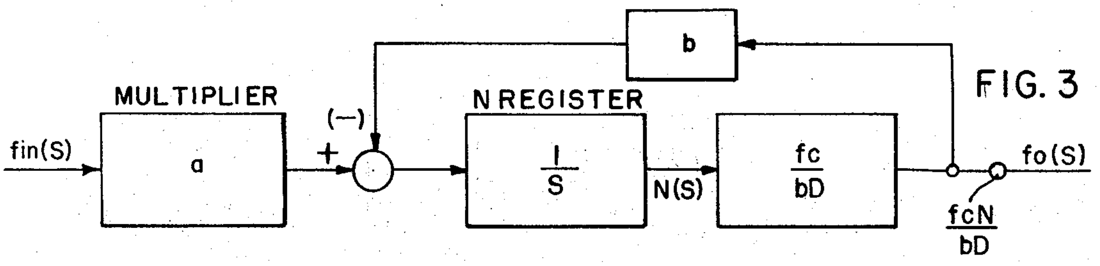
FIG. 3 is the Laplace transform of the apparatus of FIG. 2.

A Laplace transformed closed loop model of FIG. 2 is shown in FIG. 3. The Laplace mathematics is as follows:

1. $fo = fcN/bD$
2. $fo(s) = N(s)\ fc/bD$
3. $N(s) = 1/s\ [afin(s) - bfo(s)]$
4. $fo(s) = [afin(s) - bfo(s)]\ 1\ fc/sbD$
5. $fo(s) = afin(s)\ fc/sbD - bfo(s)\ fc/sbD$
6. $fo(s) + bfo(s)\ fc/sbD = afin(s)fc/sbD$
7. $fo(s)\ [1 + (bfc/sbD)] = afin(s)fc/sbD$
8. $fo(s) = [(afin(s)fc)/(sbD)]/[1 + (bfc/sbD)]$
9. $fo(s) = afin(s)fc/(sbD + bfc)$
10. $fo(s) = afin(s)fc/b(sD + fc)$
11. $fo(s)/fin(s) = (a/b)\ [fc/(sD + fc)]$
12. $fo(s)/fin(s) = a/b\ [1/(1 + SD/fc)]$
13. $fo(s)/fin(s\ ) = a/b\ [1/(1 + S)\ (D/fc)]$
14. Let $\gamma$ (sec) = ($D$ pulses)/($fc$ pulses/sec.)
15. $fo(s)/fin(s) = a/b\ [.1/1 + s(\gamma)]$ From the Laplace transform it will be noted that only one integrator, i.e., the N storage device is in the loop; the loop is stable and is characterized by an exponential response of the output *fo* to a step change in *fin*.

From a study of the time constant equation 14, it is observed that the time of response may be shortened by increasing *fc* or lowering the magnitude of *D*. Frequently, however, the magnitude of the frequency *fc* is dictated by other considerations, so that this parameter cannot be changed in a given application. The selection of the magnitude for *D* must of course be reasonable, for if *D* is made too low resolution will be lost. In the discussion of the example given in FIG. 6, *D* was made very low in order to conveniently demonstrate how *N* would stabilize within a reasonable number of cycles.

I claim as my invention:

1. Apparatus for digital frequency scaling comprising:

a. means for deriving a signal *afin* where *a* is a multiplication factor which may be an integer or a fraction, and *fin* is an input pulse train;
b. means for deriving a weighted scale signal *bfo* where *b* is a scale number 1,2,3,4 ...*m*, and *fo* is the output frequency of said apparatus;
c. means for integrating the signals *afin* – *bfo* to derive a signal *N;*
d. means for deriving a signal *bD* where *D* is a preselected stored number;
e. means enabled by a clock pulse signal *fc* for integrating the signals *bD–N* to derive a signal *R;* and
f. means for comparing *N* with *bD* and *R* with 0, for selecting the smallest scale number *b* such that *N<bD* and for delivering output signal *fo* when *R<*0.

2. Apparatus according to claim 1 wherein said means for deriving signal *afin* comprises shift register means and AND gating means, said shift register means having stored therein a coded serial binary number corresponding to the decimal *a*, said signal *a* and signal *fin* being applied as inputs to said AND gating means, the output of which is *afin*.

3. Apparatus according to claim 1 wherein said means for deriving signal *bfo* comprises number storage means for storing the values of *b*1, 2,3,4...*m*, and logic gating means, the logic gating means being connected to receive the signal *fo*, said stored numbers *b* and the selected scaled number *b*, to deliver the output *bfo*.

4. Apparatus according to claim 1 wherein said means for integrating the signals *afin–bfo* comprises an accumulating numerical shift register having an adder and a shift register, the output of said shift register being fed back as a first input to said adder, the second input to said adder being *afin–bfo*, the output of said adder being the integrated contents *N*.

5. Apparatus according to claim 1 wherein said means for deriving signal *bD* comprises number storage means for storing the numbers *bD* and logic gating means, the logic gating means being connected to receive the signal *fo*, the stored numbers *bD* and said selected scale number *b* to deliver the output *bD*.

6. Apparatus according to claim 1 wherein said means for integrating the signals *bD–N* comprises an accumulating remainder shift register having an adder and a shift register, the output of said shift register being fed back as a first input to said adder, the second input to said adder being the signal *bD–N* the output of said adder being the integrated contents *R*.

7. Apparatus for digital frequency scaling comprising:

a. first means for performing addition having dual inputs of opposite sign and an output, one of said dual inputs receiving a signal which is a multiple "*a*" times an input signal *fin* where "*a*" may be an integer or a fraction, the other of said dual inputs receiving a weighted scale signal *bfo* where *b* is a scale number 1,2,3, ...*m*, and *fo* is the output of said apparatus;

b. accumulating numerator register means having digital output contents *N*, and connected at its input to the output of said first adder means;

c. second means for performing addition having dual inputs of opposite sign and an output;

d. accumulating remainder register means having digital output contents *R*, and connected at its input to the output of said second adder means, e. one of the dual inputs of said second adder means receiving the contents *N* as a function of clock signals of frequency *fc*, the second of said dual inputs receiving a signal *bD* where *D* is a preselected stored number;

f. means coupled to said accumulating remainder register means for comparing *N* with *bD* and *R* with 0, for selecting the smallest scale number *b* such that $N < bD$ and for delivering output signal *fo* when $R < 0$.

* * * * *